United States Patent [19]

Eklund

[11] Patent Number: 4,658,630

[45] Date of Patent: Apr. 21, 1987

[54] METHOD AND APPARATUS FOR CALIBRATION OF LENGTH INDICATORS

[75] Inventor: Fritz Eklund, Karlskoga, Sweden

[73] Assignee: Aktiebolaget Bofors, Bofors, Sweden

[21] Appl. No.: 787,557

[22] Filed: Oct. 15, 1985

[30] Foreign Application Priority Data

Oct. 19, 1984 [SE] Sweden .................... 8405220

[51] Int. Cl.⁴ ............................ G01C 25/00
[52] U.S. Cl. ...................... 73/1 J; 33/172 R
[58] Field of Search ........... 73/1 J; 33/172 R, 169 R

[56] References Cited

U.S. PATENT DOCUMENTS

| | | | |
|---|---|---|---|
| 2,350,432 | 6/1944 | Verderber | 33/172 R |
| 2,670,542 | 3/1954 | Hull | 33/169 R |
| 2,883,755 | 4/1959 | Lovenston | 33/172 R |
| 2,959,970 | 12/1960 | Rocheleau | 33/169 R |
| 3,319,339 | 5/1967 | Marconi | 33/169 R |
| 3,477,133 | 11/1969 | Armato | 33/172 R X |
| 3,676,934 | 7/1972 | Freer | 33/169 R |
| 3,899,832 | 8/1975 | Hunyar | 33/552 |
| 4,367,650 | 1/1983 | Hilgner et al. | 73/649 |
| 4,485,559 | 12/1984 | Lorenzini | 33/542 |
| 4,542,473 | 9/1985 | Bailey | 73/1 J X |

FOREIGN PATENT DOCUMENTS

| | | | |
|---|---|---|---|
| 121769 | 5/1948 | Sweden | 33/172 R |
| 759150 | 10/1956 | United Kingdom | 73/1 J |
| 2094980 | 9/1982 | United Kingdom | 33/169 R |

Primary Examiner—Stewart J. Levy
Assistant Examiner—Tom Noland
Attorney, Agent, or Firm—Pollock, Vande Sande & Priddy

[57] ABSTRACT

This invention relates to a method and an apparatus for calibrating length indicators (dial indicators). The length indicators are secured in a stand and brought into contact with a number of feeler gauges adhered together into a connective sequence, which are fed in steps under the dial indicator in contact with the measuring point of the latter. According to the invention these feeler gauges preferably adhered to a reference plane with a circular surface extent in the horizontal plane. The reference plane is rotatably mounted in the same stand as the dial indicator and is rotatable under the same.

8 Claims, 4 Drawing Figures

METHOD AND APPARATUS FOR CALIBRATION OF LENGTH INDICATORS

FIELD OF THE INVENTION

This invention relates to a method and an apparatus for calibration of length indicators, usually referred to in everyday speech as dial indicators. The distinguishing feature of the invention is that the calibration is carried out with the aid of a sequence of feeler gauges adhered to each other which together represent a sufficient number of measuring intervals to give a representative picture of the condition of the length indicator.

DESCRIPTION OF THE RELATED ART

A very large number of length indicators or dial indicators are used today at different workplaces in industry. The stresses to which these dial indicators are exposed vary considerably with respect to how frequently they are used, how they are used and under what conditions they are used.

It therefore devolves upon every user to make sure that his dial indicators give correct readings, since the quality of the products manufactured by him depend upon the accuracy of the dial indicators. The normal procedure is therefore for all dial indicators to be calibrated at least once a year.

Several different methods and devices for calibration of dial indicators are already in existence. The methods and devices widely used hitherto are, however, time-consuming and the obtained calibration is not always as accurate as could be desired.

The method that is probably most commonly used today for calibrating a dial indicator is based on attaching the indicator in a stand with its measuring point in direct contact with a very high precision micrometer slidable in the direction of movement of the measuring point. The micrometer is then moved towards the dial indicator so that certain defined calibration values are shown, whereupon the difference between the value read-off on the micrometer and that read-off on the dial indicator is recorded as a calibration difference. This method, as already mentioned, is time-consuming and is also dependent upon the accuracy of both the measurement operator and the micrometer. If, on the other hand, the micrometer is of a conventional screw type, is equipped with a lever-reinforced read-off or contains electrical-digital read-off features, it is of minor importance except possibly for the precision.

Another relatively frequently used calibration method for dial indicators is to check measurement against feeler gauges which are fed one by one between a dial indicator measuring point secured in a stand above a reference plane and the reference plane. The accuracy of this method is virtually completely dependent upon the operator.

SUMMARY OF THE INVENTION

As previously pointed out, the method and apparatus according to the invention are based on a number of feeler gauges, which represent all the measurement values which it is desired to check, being adhered together into a connective sequence without play there between. These are then arranged in increasing measurement values and are passed in stages under the measuring tip of the to be checked dial indicator. In the prior-art technique, to provide a very well defined basis, a reference plane is used as a base for the feeler gauges. According to the invention, however, this reference plane is formed on a circular disc which surrounds a sturdy vertical shaft on a play-free horizontal bearing. The feeler gauges which have been given the shape of segments with a truncated tip are disposed along the periphery of the reference plane.

With the to be checked dial indicator mounted in a stand above the reference plane, which is pivotable in the horizontal plane with its adhered feeler gauges, the calibration can be performed rapidly by positioning the dial indicator to contact and zero-set against the first feeler gauge and then turning the reference plane around in stages under the dial indicator so that the measuring tip of the latter is affected by feeler gauges with different measurement values. The stages between the longitudinal dimensions of the feeler gauges have been so chosen that there can never be any doubt as to which value the dial indicator should indicate. The entire calibration procedure can thus be carried out simply by turning around the reference plane and reading off the readings on the dial indicator.

The invention is defined in the accompanying claims and an example thereof will now be described in greater detail and with reference to the appended figures of which:

DESCRIPTION OF THE PREFERRED EMBODIMENT

Figure 1:
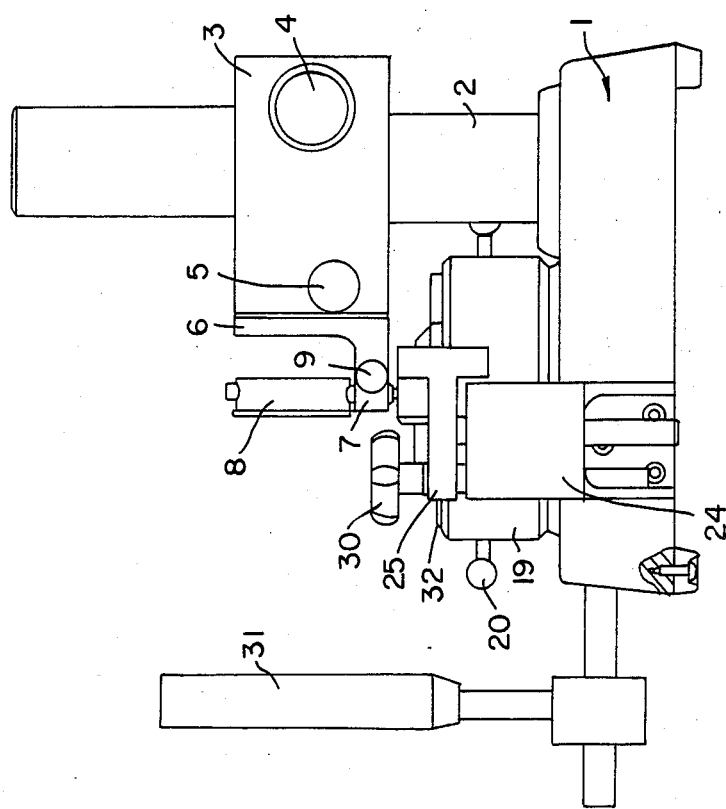
FIG. 1 shows a side projection of the present invention calibration apparatus.

The calibration apparatus illustrated in FIG. 1 comprises a stand or base plate 1 to which a vertical pillar 2 is attached. A horizontal arm 3 is movable along the pillar 2. The arm 3 grips the pillar 2 and can be secured to the same at a desired height by means of a locking knob 4. A built-in brake device (not shown) ensures that the arm will not drop down along the pillar even when the locking knob 4 is fully loosened. At the outer end of the arm 3 is a slide 6 which can be moved by means of a fine adjustment screw 5. Also provided at the outer end of the slide is a bracket 7 in which dial indicators 8 can be secured by means of a locking screw 9.

Figure 3:
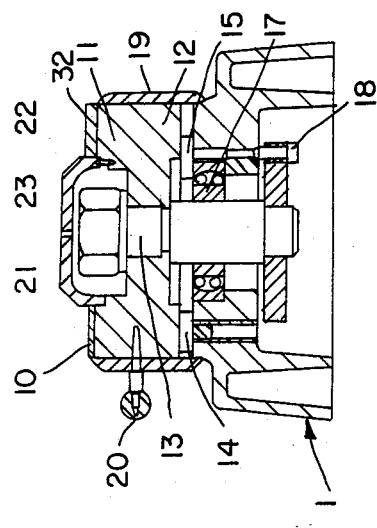
FIG. 3 and shows the cross-sectional A—A view of the FIG. 2 apparatus.

A reference plane 10 rotatable in the horizontal plane is also attached to the stand. This reference plane 10 consists of the upper side of a circular disc which is largely in the form of a wheel provided with broad flange edges 11, 12 and rotatably mounted around a fixed vertical shaft 13 in the stand (see FIG. 3). Both the said disc and the shaft 13 have very sturdy dimensions and fine tolerances to prevent play and bending which may affect the final calibration result. All other parts of the apparatus such as the pillar 2 and the arm 3 are similarly finely dimensioned. The disc with the reference plane 10 is carried not only in the bearing arrangement around the shaft 13 but also rests ordinarily on three highly accurately ground spherical support surfaces of which, only support surfaces 14 and 15 are shown in FIG. 3. The three spherical support surfaces are uniformly spaced around the shaft 13. They rest against the peripheral flanges 12 of the disc which faces downwards towards the stand 1. The shaft 13 is carried in the stand by means of a ball bearing 17. By advancing the screw 18, the shaft 13 can also be raised a sufficient amount to enable the flange 12 to pass free of the support surfaces 14–16. This is a transport position which is used when the calibration apparatus has to be moved. The rotatable disc is also provided with a dust guard 19 and handle 20 for turning it. The disc with the reference plane 10 and shaft 13 are joined together by means of a nut 21 and a washer 22. These are covered by a cover 23. Between the cover 23 and the dust guard 19 the reference plane is covered by a sequence of adjacently adhered feeler gauges 32 which have the shape of truncated circular segments truncated towards the tip. The feeler gauges 32 are adhered together edge to edge without interruption and have successively varying longitudinal dimensions, i.e. different thickness. All measuring values desirable for calibrating dial indicator 8, which is secured in the holder 7, are covered by the adhered gauges.

Figure 4:
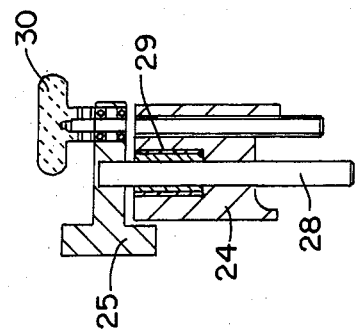
FIG. 4 shows the cross-sectional B—B view of the FIG. 2 apparatus.

Also attached to the stand 1 is a bracket 24 in which a second slide 25 is movably carried. A spring balance 26 in turn is attached to this second slide 25. The spring balance 26 is provided with a measuring tongue 27. As evident from FIG. 4, the slide is carried in the bracket 24 by a guide shaft 28 with a ball bearing 29 to minimize the stresses and thus ensure motion as frictionless as possible. The movement of the slide is regulated by the screw 30 carried in a ball bearing in the slide 25.

Figure 2:
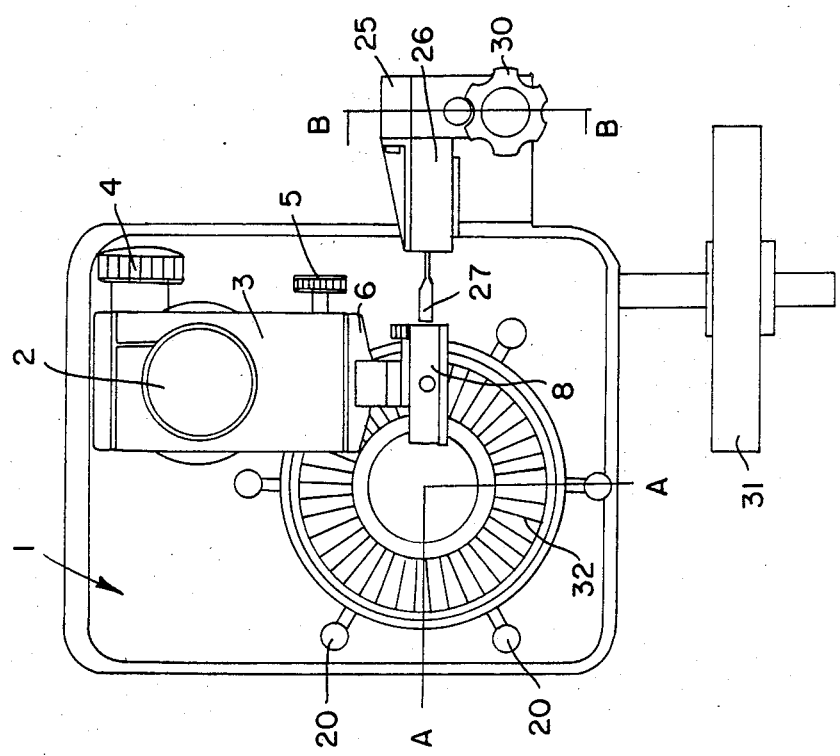
FIG. 2 a plan view of the calibration apparatus.

To facilitate readings of both the dial indicator 8 and the spring balance 26, both of which have their scales facing towards the bottom in FIG. 2, an adjustable magnifying glass 31 is located in front of both dial indicator 8 and spring balance 26.

For calibration of a dial indicator with the aid of the apparatus described above, the following technique is used:

The dial indicator 8 is mounted in the bracket 7 whereupon the arm 3 is swung out so that the measuring point of the dial indicator is brought into contact with the measuring tongue 27 of the spring balance 26. The spring balance is then moved towards the dial indicator by means of the knob 30 and the measuring force is read. After checking the requisite measuring force, the arm 3 is swung in above the reference plane 10 and the measuring tip of the dial indicator 8 is brought into contact with the first feeler gauge 32 and zeroed with the aid of the knob 5. The reference plane, with the feeler gauges thereon, is then turned around in stages; and the differences between the measuring values of the feeler gauges 32 and the reading of the dial indicator 8 are noted. As previously mentioned, the steps between the different feeler gauges are so selected that there can never be any doubt whatsoever as to which values are intended.

The disc with the reference surface 10 can easily be made replaceable. The same calibration apparatus can therefore be equipped with several different reference planes with different feeler gauge sequences to facilitate checking of different types of dial indicators.

The invention is defined in the accompanying claims and shall not be considered to be limited by this example.

I claim:

1. A method of calibrating a length indicator, comprising:
   securing the length indicator in a stand above a reference plane;
   adhering together a plurality of feeler gauges to form a connected sequence of feeler gauges having successively greater longitudinal dimensions, the feeler gauges including all dimensional values needed for calibrating the length indicator;
   moving the adhered feeler gauges between the reference plane and a measuring point of the length indicator;
   moving the sequence of feeler gauges in stages in contacting relationship with the measuring point of the length indicator;
   whereby differences between the longitudinal dimensional values of the feeler gauges and the readings of the length indicator indicate erroneous readings for the length indicator.

2. A method according to claim 1, further comprising:
   moving the adhered feeler gauges in step under the measuring point of the length indicator, each of the feeler gauges being located within a corresponding plane in parallel to the reference plane.

3. Method according to claim 1, wherein the moving a plurality of reference planes step comprises:
   disposing around the shaft on a circular axially rotatable reference plane the adhered feeler gauges, each of the feeler gauges having the shape of a truncated circular sector.

4. An apparatus for calibrating length indicators, comprising:
   a base having a vertical shaft;
   a circular reference plane disposed horizontally around the shaft, the reference plane rotatable around the shaft;
   a plurality of adhered feeler gauges having successively greater longitudinal dimensions placed on top of the reference plane;
   a vertical pillar located at a first side of the reference plane;
   an arm coupled to the pillar, the arm movable vertically along the pillar and protruding above the reference plane;
   a bracket connected to the arm for attaching a length indicator, the length indicator having a measuring point in contact relationship with the feeler gauges;
   whereby the calibration of the length indicator is performed by comparing the readings of the length indicator with the measurement values of the feeler gauges contacted by the measuring point.

5. An apparatus according to claim 4, wherein the feeler gauges comprise circular segments truncated toward the tip in successively varying length dimensions, the segments having been adhered together to form a connected sequence along the periphery of the reference plane.

6. An apparatus according to claim 5, wherein the feeler gauges are permanently adhered to the reference plane.

7. An apparatus according to claim 5, wherein the reference plane rests on three accurately ground and horizontally disposed spherical supports, the supports being uniformly spaced around the shaft.

8. An apparatus according to claim 4, further comprising:
   a spring balance located to a second side of the reference plane, the spring balance including a measuring tongue;
   whereby the arm coupled to the pillar may be moved from a first position wherein the length indicator is located over the reference plane to a second position wherein the length indicator in located over the measuring tongue.

* * * * *